United States Patent
Applewhite et al.

(10) Patent No.: US 8,881,254 B2
(45) Date of Patent: Nov. 4, 2014

(54) METHOD AND SYSTEM FOR MANAGING VIRTUAL OBJECTS IN A NETWORK

(75) Inventors: Roger Warren Applewhite, Palos Verdes Estates, CA (US); Dean Adam Gittleson, Valley Center, CA (US)

(73) Assignee: MagTek, Inc., Seal Beach (*) Notice: Subject to any disclaimer, the term of this patent is extended or adjusted under 35 U.S.C. 154(b) by 1025 days.

(21) Appl. No.: 12/077,143

(22) Filed: Mar. 17, 2008

(65) Prior Publication Data

US 2009/0119764 A1    May 7, 2009

Related U.S. Application Data

(60) Provisional application No. 61/001,378, filed on Nov. 2, 2007.

(51) Int. Cl.
*H04L 9/32* (2006.01)
*G06Q 40/00* (2012.01)
*G06K 7/08* (2006.01)

(52) U.S. Cl.
USPC .................................. 726/9; 705/44; 235/449

(58) Field of Classification Search
USPC .................................. 726/9; 705/44; 235/449
See application file for complete search history.

(56) References Cited

U.S. PATENT DOCUMENTS

| | | | |
|---|---|---|---|
| 5,920,628 A | 7/1999 | Indeck et al. | |
| 6,098,881 A | 8/2000 | DeLand, Jr. et al. | |
| 6,111,579 A * | 8/2000 | Alimpich et al. | 715/853 |
| 6,899,269 B1 | 5/2005 | Deland | |
| 7,210,627 B2 | 5/2007 | Morley, Jr et al. | |
| 7,319,976 B1 * | 1/2008 | Peckover | 705/14.36 |
| 7,377,433 B2 | 5/2008 | Morley, Jr. et al. | |
| 7,478,751 B2 | 1/2009 | Morley, Jr. et al. | |
| 7,703,676 B2 | 4/2010 | Hart et al. | |
| 2002/0010679 A1 * | 1/2002 | Felsher | 705/51 |
| 2003/0014423 A1 * | 1/2003 | Chuah et al. | 707/102 |
| 2005/0044411 A1 * | 2/2005 | Somin et al. | 713/201 |
| 2006/0101067 A1 * | 5/2006 | Kilian-Kehr et al. | 707/103 R |
| 2006/0230073 A1 * | 10/2006 | Gopalakrishnan | 707/104.1 |
| 2007/0135943 A1 * | 6/2007 | Fukui et al. | 700/65 |
| 2007/0150942 A1 * | 6/2007 | Cartmell | 726/5 |
| 2008/0091944 A1 * | 4/2008 | von Mueller et al. | 713/168 |
| 2008/0167106 A1 * | 7/2008 | Lutnick et al. | 463/16 |

FOREIGN PATENT DOCUMENTS

WO    WO 2007/023420    * 3/2007

* cited by examiner

*Primary Examiner* — Saleh Najjar
*Assistant Examiner* — Shu Chun Gao
(74) *Attorney, Agent, or Firm* — KPPB LLP

(57) ABSTRACT

A method and apparatus for managing virtual objects in a network is provided. The method includes creating a unique link between at least one virtual object and a physical token. The at least one virtual object is represented by a first set of distinct predefined properties and is associated with a data set. Further, the method includes maintaining information about the unique link between the at least one virtual object and the physical token and information about the first set of distinct predefined properties. Furthermore, the method includes regulating access to the at least one virtual object based on a second set of predefined properties and verification of the physical token.

22 Claims, 5 Drawing Sheets

METHOD AND SYSTEM FOR MANAGING VIRTUAL OBJECTS IN A NETWORK

CROSS REFERENCE TO RELATED APPLICATION

This application claims the benefit of provisional patent application No. 61/001,378 filed Nov. 2, 2007.

FIELD OF THE INVENTION

The invention relates in general to the field of virtual objects. More specifically, the invention relates to managing virtual objects in a network.

BACKGROUND

Nowadays, people are increasingly using the virtual space for daily life activities such as interacting with people, performing a transaction, playing a game, and even living the life of a virtual character in a virtual world for entertainment. Generally, a person uses a virtual entity to perform an activity in the virtual space. Examples of the virtual entities corresponding to the above mentioned activities can be a social profile on an online networking website for interacting with people, a bank account for performing a transaction, a gaming character or a gaming account for online gaming, and a virtual character in the virtual world.

Generally, the virtual entities for performing an activity are unique for each person, for example, every person has a unique social profile for interacting with people and every person has a unique bank account for performing transactions. Therefore, in effect it can be said that the virtual entities are owned by their users. Many a times, a virtual entity also holds monetary value for its owner. The monetary value can be the cost incurred by the owner to obtain the virtual entity, for example the fee paid to open a gaming account on an online gaming website. Also, the monetary value could get enhanced over time. For example, the owner can play a game and earn special powers for the player associated with his/her gaming account thus making it more valuable. However, using the existing frameworks, the virtual entities owned by a person can not be easily traded for their monetary value as a physical object can be.

Many existing systems establish the ownership of the virtual entities by providing access to the virtual entities based on access authorization, for example by using a username/password. Hence, a virtual entity may be traded by selling off the username/password for accessing the virtual entity. However, the sale of a username/password is much more complicated than the sale of a physical object as secrecy and complete transfer of ownership have to be ensured. Also, many times a virtual entity itself can include multiple virtual objects associated with it. For example, a person owns a football team on an online gaming website that includes 11 players, of which one player has the highest ranking on the website. In the real world, another person may be willing to pay a thousand dollars, for example, to buy this player. However, the owner would normally have a single username/password for the whole team and hence would be unable to make the trade for the specific player. Hence, the ownership of the virtual entity and the virtual objects associated with it can not be differentiated thus making trading less flexible. In the above example, even if the owner was somehow able to make the trade, the buyer would have a hard time integrating the player into his existing team. Therefore, presently the user does not have any efficient mechanism to extract the monetary value of his virtual possessions. Further, the existing systems do not support the concept of trading of virtual entities.

In light of the above, there is a need for a method and system that facilitate trading of virtual entities thus enabling an owner of a virtual entity to extract its monetary value in the real world. Further, the method and system should provide differential access to virtual entities as well as their sub-parts to enhance the flexibility in trading.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DETAILED DESCRIPTION OF THE INVENTION

Various embodiments of the invention provide methods and systems for managing virtual objects in a network. In one embodiment, a method for managing at least one virtual object in a network is provided. The method includes creating a unique link between the at least one virtual object and a physical token. The at least one virtual object is represented by a first set of distinct predefined properties and is associated with a data set. Further, the method includes maintaining information about the unique link between the at least one virtual object and the physical token and the first set of distinct predefined properties. Moreover, the method includes regulating access to the at least one virtual object based on a second set of predefined properties and verification of the physical token.

In another embodiment, a system for managing at least one virtual object in a network is provided. The system includes a linking module configured to create a unique link between the at least one virtual object and a physical token. The at least one virtual object is represented by a first set of distinct predefined properties and is associated with a data set. Further, the system includes a database for maintaining information about the unique link between the at least one virtual object and the physical token and the first set of distinct predefined properties. Moreover, the system includes a processor configured to regulate access to the at least one virtual object based on a second set of predefined properties and verification of the physical token.

Figure 1:
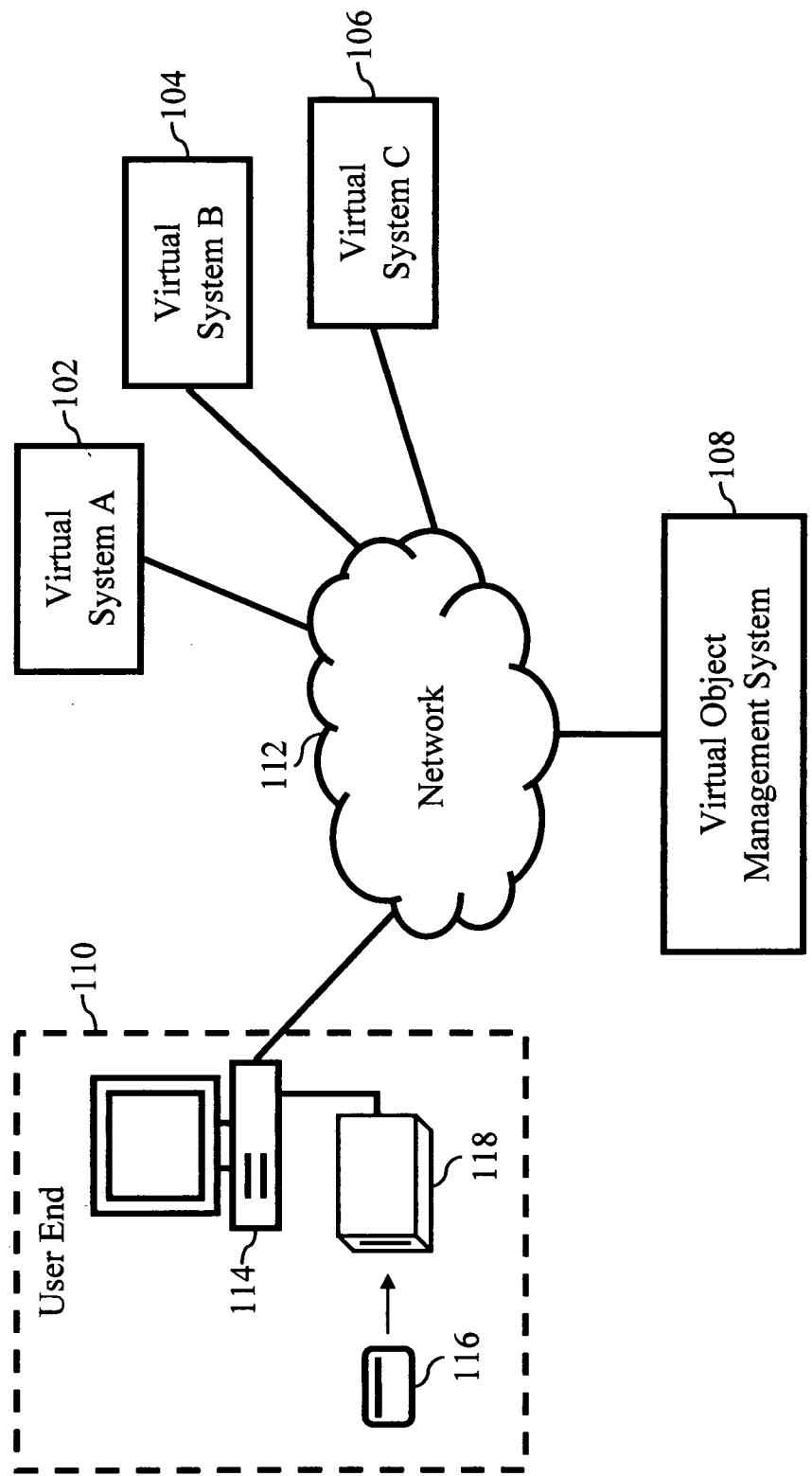
FIG. 1 illustrates an exemplary communication network in which various embodiments of the invention can be practiced.

FIG. 1 illustrates an exemplary communication network in which various embodiments of the invention can be practiced. The communication network can include various virtual systems, a virtual object management system and multiple users. For the purpose of this description, the communication network is shown to include a virtual system A, 102, a virtual system B, 104, a virtual system C, 106, a virtual object management system, 108, and a user end, 110. Further, all these components are linked to each other via a network, 112. Examples of the network 112 can include, but are not limited to, the Internet, a mobile phone network, a computer network, a Local Area Network (LAN), a wireless network, and a wired network. The virtual system A 102, the virtual system B 104 and the virtual system C 106 are hereinafter collectively referred to as the virtual systems 102-106. Examples of the virtual systems 102-106 include, but are not limited to, a virtual world website, a banking system, a credit card system, an online gaming website, an online legal contract management system, a social networking website, an online service provider system, an online financial system, and an online communication system.

The virtual systems 102-106 can provide various kinds of services to their users, for example, financial services, communication services, entertainment services, data management services, certification services, and the like. To provide these services to various users, the virtual systems 102-106 maintain unique virtual objects for each user. For example, every person has a unique social profile for interacting with people and every person has a unique bank account for performing transactions. Therefore, it can be said that each virtual object is owned by its user. A virtual object can be defined as a set of properties or characteristics that hold meaning to the user in a particular context. The context can be in the virtual space, for example a virtual world, or in the real world, for example the American legal system. In the former, the virtual object could be a character in an online game and in the latter the virtual object could be a digital representation of a legal contract. The character in the online game will have properties such as a name, a strength value, a skill value, a score value and other properties associated with it. Collectively, this set of properties will define the virtual object associated with the character. A virtual object can be accessed and manipulated only by its authorized owner. Further, the virtual systems 102-106 provide various rules defining how various virtual objects may interact with each other.

Various examples of the virtual objects can include, but are not limited to, a character in an online game, a profile in a social networking system, a character in a virtual world, an avatar in a virtual world, a shopping cart, a customer account, an electronic representation of a legal document, an electronic representation of a user medical data, an electronic representation of money, an electronic representation of a membership, an electronic representation of ownership of a physical object, an electronic representation of rights to access to a resource, a customer profile, a system configuration, a discount on items for sale, an offer to sell a physical object, an offer to sell a virtual object, a bid at an auction, an electronic representation of loyalty points, the status of a membership, a computer code, and an executable script.

The virtual object management system 108 manages the various virtual objects existing on the virtual systems 102-106. The virtual object management system 108 links each virtual object to a physical token. Thereafter, access to the virtual object is granted to the owner of the physical token linked to it. This can be thought of as governing the ownership of the virtual object by the ownership of a physical token, wherein the physical token governs access to the virtual object. The virtual object management system acts as an intermediary between the user end 110 and the virtual systems 102-106.

The user end 110 is the point from where the user tries to access a service from, say, the virtual system A 102. The user end 110 includes a communication device, 114, a physical token, 116, and a reading device 118. Examples of the communication device 114 can include, but are not limited to, a personal computer, a notebook computer, a mobile phone, and a Personal Digital Assistant (PDA). Examples of the physical token 116 can include, but are not limited to, a memory card, a magnetic stripe card, a smart card, a card with a barcode, a cell phone, an electronic device, an electronic device with an embedded serialization, a unique electronic device, a fingerprint, a pattern of a human iris, a pattern of blood vessels in a human cornea, a human DNA, and a biometric characteristic.

The communication device 114 is connected to the reading device 118 and the network 112. To access the service, the user needs to gain access to his/her virtual object on the virtual system A 102 which is linked to the physical token 116 by the virtual object management system 108. Therefore, to access the virtual object, the user has to insert the physical token 116 into the reading device 118 which reads the physical token 116 and sends an electronic representation of the physical token 116 to the communication device 114. The communication device 114 forwards the electronic representation of the physical token 116 to the virtual object management system 108 to get the physical token 116 authorized. For one embodiment, the communication device 114 may encode the electronic representation of the physical token 116 while forwarding it to the virtual object management system 108. On authorization of the physical token 116, the virtual object management system 108 grants access to the virtual object. Thereafter, the virtual object may be accessed by the user by using the communication device 114.

Figure 2:
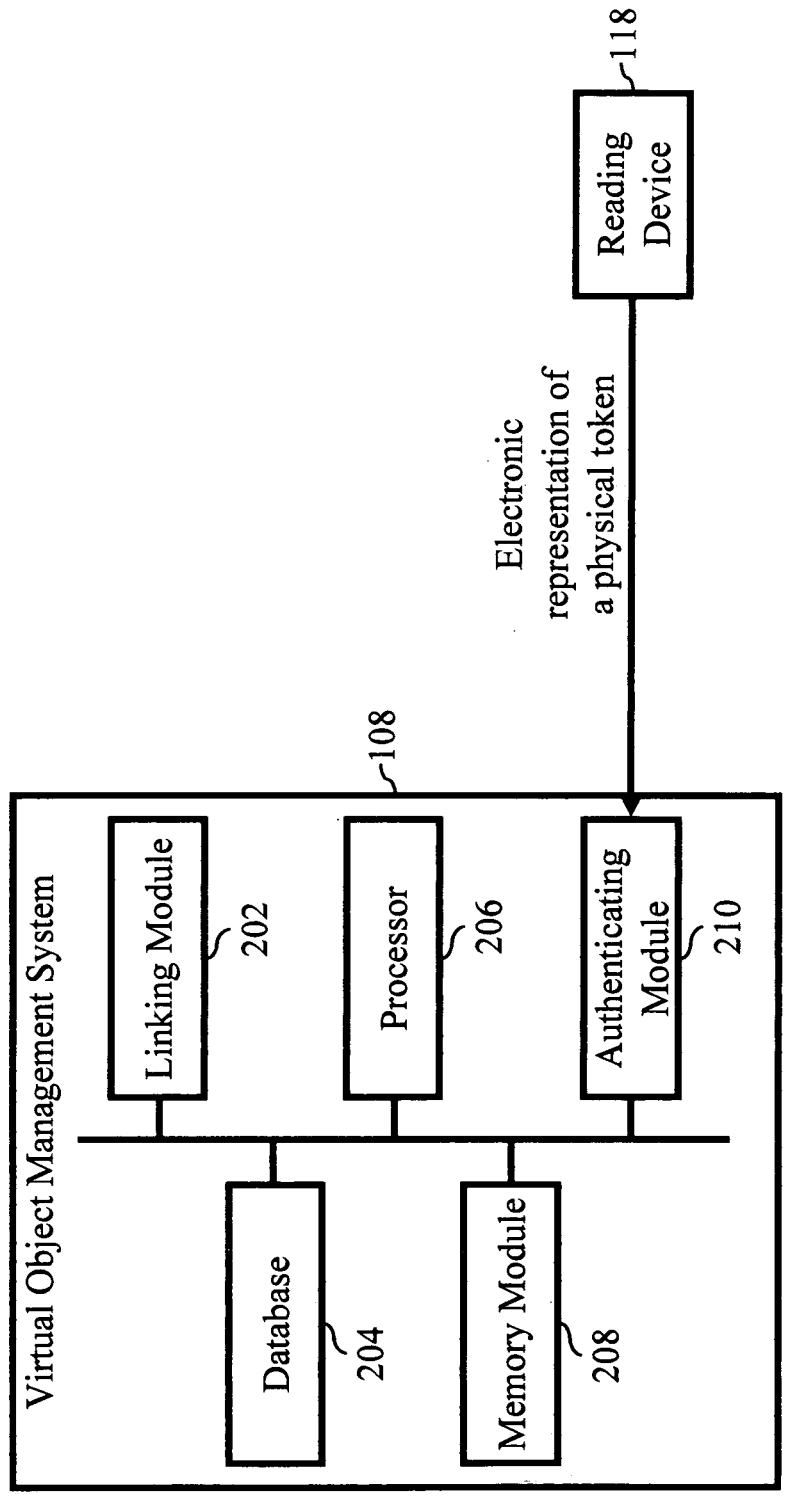
FIG. 2 illustrates a system for managing at least one virtual object in a network in accordance with an embodiment of the invention.

FIG. 2 illustrates a system for managing at least one virtual object in a network, in accordance with an embodiment of the invention. The system includes a linking module, 202, a database, 204, and a processor 206. It will be apparent to those skilled in the art that the system can include all or fewer number of components than the components shown in FIG. 2. Further, those skilled in the art will understand that the system can include additional components that are not shown here, since they are not germane to the operation of the system, in accordance with the inventive arrangements. To describe the system, reference will be made to FIG. 1 although it should be understood that the system can also be implemented in any other suitable environment or network. In an exemplary scenario, the system can correspond to the virtual object management system 108 shown in FIG. 1.

The system 108 can manage at least one virtual object in a network. The linking module 202 can be configured to create a unique link between the at least one virtual object and a physical token. In an exemplary scenario, the physical token can be the same or similar to the physical token 116 described in FIG. 1. Also, the at least one virtual object can be the same or similar to the virtual objects described in FIG. 1. The unique link can be in the form of a reference on the physical token to the virtual object or a record in a database mapping the virtual object onto the physical token. In an embodiment, the at least one virtual object may be linked to a plurality of physical tokens.

Further, the at least one virtual object is represented by a first set of distinct predefined properties. The first set of distinct predefined properties is the set of all the properties that collectively describe the at least one virtual object. It will be apparent to those skilled in the art that additional properties can be added to the first set of distinct predefined properties on a need be basis. Additional properties may be added to improve processing performance, reporting, administrative access, and various other parameters. In an embodiment, a property already present in the first set of distinct predefined properties may be further differentiated into multiple properties, so as to provide a higher level of detail regarding the property.

Each property in the first set of distinct predefined properties includes various fields. Examples of these fields can include, but are not limited to, ObjectName, PropertyName, HumanName, Description, Format, Created, WhoCreated, Modified, WhoModified, Owner, Value, Rights, and Initialize. The ObjectName field refers to the name of the object to which the property is related. The PropertyName field refers to the name of the property. The HumanName field refers to a more descriptive name which can be more easily understood by users. The Description field refers to a description of the property. The Format field refers to the format of the value of the property, for example as a regular expression (text) or as a binary expression. The Created and WhoCreated fields refer to the time the property was created for the object and the name of the object that created the property respectively. The Modified and WhoModified fields refer to the time the property was last modified and the name of the object that last modified the property respectively. The Owner field refers to the owner of the property template from which the property was created. The Value field refers to the value of the property. The Rights field refers to the data that describes who may read or modify the property and under what access conditions. The Initialize field refers to the information regarding whether this property should be passed on to other objects created by this object and what should the initial values of the fields in the created property be.

The first set of distinct predefined properties can include many types of properties such as system properties, linking properties, object properties, schema-oriented properties, pointer-oriented properties, and signature-oriented properties. Examples of system properties of a virtual object can include, but are not limited to, Name, Session, Creation, Membership, Members, Request, Invitation, Grant, PublicProperty, and RegisterMinimum. The value of the Name property denotes the name of the virtual object and associates a unique index to it that represents the physical token to which it is linked. This property also indicates the type and serialization of the computer interface originally used to create the object. The value of the session property indicates the last time the physical tokens representing this virtual object were verified. This property also includes the index of the token, the type of computer interface employed, and the interface's unique serialization.

The value of the Creation property indicates the minimum number and type of tokens that must be presented in order for this virtual object to create another virtual object. The value of the Membership property denotes the list of objects that this object has joined. By joining another object, this object may inherit rights and properties from the other object. The value of the Members property denotes the list of objects that have joined this object. The value of the Request property denotes the list of objects that this object would like to join, and the conditions the owner is willing to comply with to join. The value of the Invitation property denotes a list of objects that this object has invited to become members, and the conditions of membership. The value of the Grant property indicates the list of objects to which this object has granted rights, with a detailed list of the granted rights. The value of the PublicProperty property denotes the list of the property templates that this object allows other objects to use, under the assumption that this object owns the templates. The value of the RegisterMinimum property indicates the minimum number and type of tokens that must be verified for an object to add a property template to a registry. It will be apparent to those skilled in the art that the system properties described above can serve all or even a fewer number of purposes.

Further, the linking properties can include the properties containing information regarding the unique links between the at least one virtual object and the physical token. The object properties can include the properties that are discretionary and unique to the particular context of the virtual object. For example, a bank account virtual object may have an account balance property that is unique to the context of the banking system. All the object properties together represent the complete meaning of the virtual object. The schema-oriented properties, pointer-oriented properties, and signature-oriented properties are sub-sets of the object properties. The schema-oriented properties are those which directly represent some characteristic of the virtual object, for example, the score of a gaming character in an online game. The pointer-oriented properties are those which contain pointers to data on other systems, wherein that data directly represents some characteristic of the virtual object. The signature-oriented properties are those which contain unique cryptographic representations of data existing elsewhere that represents the value of the property. The cryptographic representation can be used to verify the authenticity of this data. In an embodiment, properties can be added to virtual objects by using predefined property templates stored in a registry. The property templates include all the predetermined values of the fields in a property. Moreover, the at least one virtual object is associated with a data set. This data set contains various rules governing the behavior of the virtual object. The data set also contains rules defining interoperability of the virtual object across a set of virtual systems.

The database 204 can maintain information about the unique link between the at least one virtual object and the physical token. The database 204 can also maintain information about the first set of predefined properties. The database 204 can be used to identify the virtual object that is linked to a physical token and vice-versa. This link can be required when a user is trying to access the virtual object or when a physical object has been provided to access a virtual object.

The processor 206 can be configured to regulate access to the at least one virtual object based on a second set of predefined properties and verification of the physical token. The second set of predefined properties includes the properties defining the access to be granted to the virtual object on verification of the physical token. The processor 206 can also be configured to grant access to the at least one virtual object when the physical token has been verified. The access provides at least one of a reading right, a writing right and a modifying right for the at least one virtual object based on the second set of predefined properties. In an embodiment where the at least one virtual object is linked to a plurality of physical tokens, some or all tokens of the plurality of physical tokens may need to be verified to grant access to the at least one virtual object.

Further, the processor 206 is configured to alter one or more of the unique links and the first set of distinct predefined properties based on the access granted. In an exemplary scenario, the unique link may be altered when the at least one virtual object interacts with another virtual object. For example, let us consider a virtual character named Suzie in a virtual world, who is owned by a user in the real world, such ownership being represented by the unique link between Suzie and the user's physical token. Suzie owns a virtual dog, who her real world owner decides to sell to John, another virtual character who is owned by yet another real world user. After the dog is sold, the link of the virtual object corresponding to the dog will change from Suzie's owner's token to John's owner's token. Alternatively, if the dog itself is linked uniquely to only one physical token of the user, and not linked to Suzie explicitly, no modification of the link is necessary, as the transference of ownership of the dog between users could be accomplished by trading the physical token.

The processor 206 is also configured to maintain a log of each activity performed by the at least one virtual object. Considering the above example of Suzie, the log will record all her activities over time, for example, Suzie gets a new pet cat, she takes the cat for a walk in the park, Suzie goes on a world tour and she buys music. In an embodiment, the log may be stored by the processor for future use. Moreover, the processor 206 is also configured to analyze the log of each activity performed by the at least one virtual object. The processor may retrieve historical information regarding the activities performed by the at least one virtual object from the stored log of activities. Moreover, the processor 206 can also identify a set of personal characteristics of a user of the physical token corresponding to the at least one virtual object based on the analysis. In light of the above example, based on the analysis of the log of her past activities, it can be identified that Suzie's owner is fond of pets, likes travelling and enjoys listening to music. Based on these identified personal characteristics, appropriate promotions may be targeted towards Suzie's owner.

Furthermore, the processor 206 can also be configured to apply a compatibility function to the at least one virtual object for interoperability across the set of predefined virtual systems. In an exemplary scenario, there exist two virtual worlds, one for humans and another for penguins. A user owns a person in the human virtual world and a penguin in the penguin virtual world. Now if the user wishes to show the penguin to his/her friends in the human virtual world, then the penguin will have to be accessed from the human virtual world. In this case, the processor 206 can apply the compatibility function to the penguin virtual object to provide interoperability between the two virtual worlds. An example of the compatibility function can include conversion of the mass of the penguin from pounds, the unit used in the penguin virtual world, into kilograms which is used in the human virtual world. Another example of the compatibility function can include converting the visual rendering details from the penguin world format into the visual rendering details of the human world format. In an exemplary scenario, the compatibility function can be defined with respect to a home system and a visited system. For example, in this case, the penguin virtual world can be the home system and the human virtual world can be the visited system.

In an embodiment, the system 108 can also include a memory module 208. The memory module 208 can store at least one of the first set of predefined properties and the data set. The memory module 208 can also store the log of each activity performed by the at least one virtual object.

In another embodiment, the system 108 can also include an authenticating module 210. The authenticating module 210 can verify the authenticity of the physical token based on an electronic representation of the physical token derived from the reading device 118. In an embodiment, the authenticating module 210 can access the database 204 to verify the authenticity of the physical token to access the at least one virtual object.

In an embodiment, the physical token can be physically distinct from every other physical token. For example, when the physical token is a magnetic stripe card, it can possess a unique magnetic fingerprint based on the arrangement of magnetic particles in the strip during manufacturing. This unique fingerprint of the magnetic stripe card makes it distinct from every other magnetic stripe card, including even those that are manufactured from the same source. In another embodiment, the system can also include the reading device 118 that can read the physical token. The reading device 118 can generate an electronic representation of the physical token which can be used for authentication. The reading device 118 can also be associated with a virtual system and hence, can only read physical tokens associated with virtual objects of this virtual system. However, in yet another embodiment, the reading device can be configured for use across a set of virtual systems based on a set of predefined conditions. The set of predefined conditions can include conditions based on compatibility, conditions based on interoperability rules, conditions based on usage charges, and the like.

Figure 3:
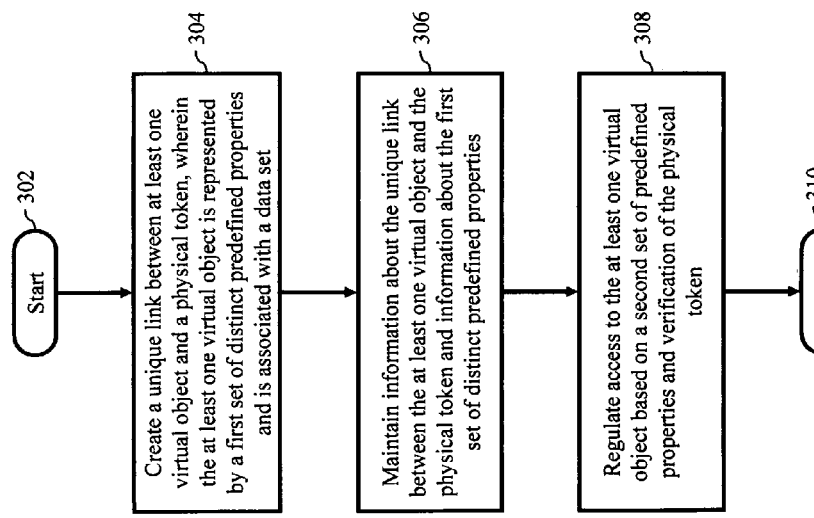
FIG. 3 is a flow diagram of a method for managing at least one virtual object in a network in accordance with an embodiment of the invention.

FIG. 3 is a flow diagram of a method for managing at least one virtual object in a network, in accordance with an embodiment of the invention. To describe the flow diagram, reference will be made to FIG. 1 and FIG. 2, although it should be understood that the flow diagram can be implemented in any other suitable environment or network. Moreover, the invention is not limited to the order in which the steps have been listed in the flow diagram.

The method for managing the at least one virtual object is initiated at step 302. At step 304, a unique link is created between the at least one virtual object and a physical token. In an exemplary scenario, the physical token can be the same or similar to the physical token 116 described in FIG. 1. Also, the at least one virtual object can be the same or similar to the virtual objects described in FIG. 1. The at least one virtual object is represented by a first set of predefined properties and is associated with a data set. In an embodiment, the linking module 202 can create the unique link between the at least one virtual object and the physical token.

At step 306, information about the unique link between the at least one virtual object and the physical token and information about the first set of predefined properties is maintained. In an embodiment, the database 204 can maintain information about the unique link between the at least one virtual object and the physical token and information about the first set of predefined properties. This information can be required when a user is trying to access the virtual object or when a physical object has been provided to access a virtual object.

At step 308, access to the at least one virtual object is regulated based on a second set of predefined properties and verification of the physical token. In an embodiment, the processor 206 can regulate access to the at least one virtual object based on a second set of predefined properties and verification of the physical token. The second set of predefined properties includes the properties defining the access to be granted to the virtual object on verification of the physical token. In an embodiment, regulating access also includes granting access to the at least one virtual object when the authenticity of the physical token has been verified. The access can provide at least one of a reading right, a writing right and a modifying right for the at least one virtual object based on the second set of predefined properties. Thereafter, the method is terminated at step 310.

In an embodiment, the method can also include storing at least one of the first set of distinct predefined properties and the data set at the memory module 208. In another embodiment, at least one of the first set of distinct predefined properties and the data set can be stored with a service provider. In this case, the memory module 208 stores pointers to the first set of distinct predefined properties and the data set on the service provider's system.

Further, the method can also include receiving an access request for the at least one virtual object. The access request can be received from a user who wishes to access the at least one virtual object. On receipt of the access request, the database 204 can be used to determine the physical token linked to the at least one virtual object. Thereafter, a message requesting the user to provide the identified physical token is sent to the user. On receiving the message, the user provides the physical token. In another embodiment, the method also includes verifying the authenticity of the physical token. The authenticity of the physical token is verified by determining whether this is the physical token to which the at least one virtual object is linked. If the physical token is verified to be authentic, access to the at least one virtual object is granted. In another embodiment, the method also includes altering one or more unique links and the first set of predefined properties based on the access granted.

In an embodiment, the at least one virtual object can be contextually associated with a set of virtual objects. For example, the at least one virtual object can represent a football team from an online gaming website and the set of virtual objects could be the individual players of the team. Hence, the at least one virtual object can be the parent object for the set of virtual objects.

In an exemplary scenario, the method can also include performing functions on the at least one virtual object to manipulate it. The at least one virtual object can be manipulated by its owner using these functions. The functions can be initiated by using various predefined commands. Examples of the predefined commands can include, but are not limited to, a Read command, a Write command, a Create command, a Join/Unjoin command, a RegistryWrite command, and a Who command. The Read command can initiate the function for sending a value stored in a particular property and field or a set of properties and fields to a predefined destination. The Write command can initiate the function for changing a value stored in a particular property and field to a new value. Further, the function initiated by the Write command can also verify that the new value meets the property's format requirement before making the change. The Create command can initiate the function for creating a new virtual object from an existing virtual object or from a blank template. The Join/Unjoin property can initiate the function for joining or unjoining the contextual link between two virtual objects. The RegistryWrite command can initiate the function for placing a new property template in the template registry. The Who command can initiate the function for returning the name of the one or more virtual objects that are linked to the physical token presented by a user.

Figure 4:
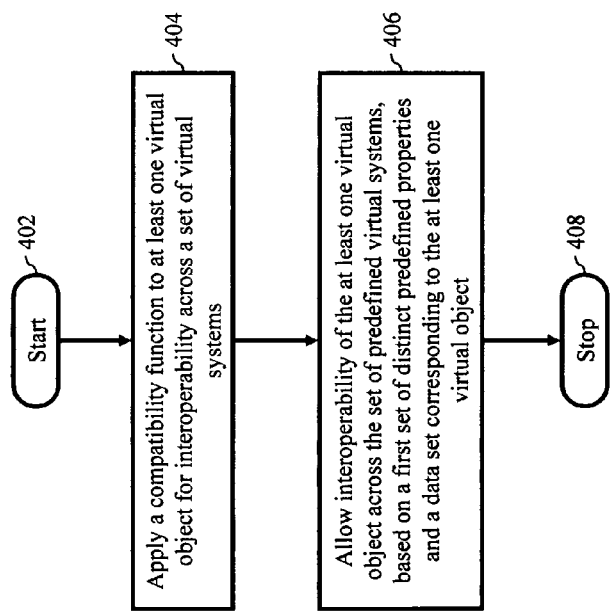
FIG. 4 is a flow diagram of a method for providing interoperability of at least one virtual object across a set of virtual systems in accordance with an embodiment of the invention.

FIG. 4 is a flow diagram of a method for providing interoperability of at least one virtual object across a set of virtual systems, in accordance with an embodiment of the invention. To describe the flow diagram, reference will be made to FIG. 1 and FIG. 2, although it should be understood that the flow diagram can be implemented in any other suitable environment or network. Moreover, the invention is not limited to the order in which the steps have been listed in the flow diagram.

The method for providing interoperability of the at least one virtual object across a set of virtual systems is initiated at step 402. In an exemplary scenario, the at least one virtual object can be the same or similar to the virtual objects described in FIG. 1. Examples of the virtual systems may include a virtual world, a banking system, a gaming website, an online service provider, and the like. At step 404, a compatibility function is applied to the at least one virtual object for interoperability across the set of virtual systems. In an embodiment, the processor 206 can apply the compatibility function to the at least one virtual object for interoperability across the set of virtual worlds.

In an embodiment, the at least one virtual object can be associated with at least one virtual system that is not included in the set of virtual systems. Hence, properties in a first set of distinct predefined properties of the at least one virtual object can correspond to the at least one virtual system. However, the properties in the first set of distinct predefined properties of virtual objects in the set of virtual systems can differ from the properties in the first set of distinct predefined properties of the at least one virtual object. For example, the at least one virtual system may store mass of an object in pounds and visual display information in the form of images whereas the set of virtual systems may store the mass in kilograms and visual display information in the form of three dimensional co-ordinates. Therefore, the compatibility function is applied to the at least one virtual object to make it compatible with the set of virtual systems. In light of the above example, the compatibility function will convert the mass of the object from pounds to kilograms and convert the display information from the image format into the three dimensional co-ordinate format. Hence, the at least one virtual object will become compatible with the set of virtual worlds.

At step 406, interoperability of the at least one virtual object across the set of virtual systems is allowed, based on the first set of distinct predefined properties and a data set corresponding to the at least one virtual object. In an embodiment, the processor 206 can allow the interoperability of the at least one virtual object across the set of virtual systems. By allowing interoperability, the at least one virtual object can be accessed from the set of virtual worlds. For example, let us say we have two virtual worlds, a human virtual world and a penguin virtual world. If interoperability was allowed across the two worlds, then the penguins from the penguin virtual world could visit the human virtual world and vice-versa. Thereafter, the method is terminated at step 408.

In an exemplary scenario, the method described in FIG. 4 can be used in conjunction with the method for managing at least one virtual object described in FIG. 3.

Figure 5:
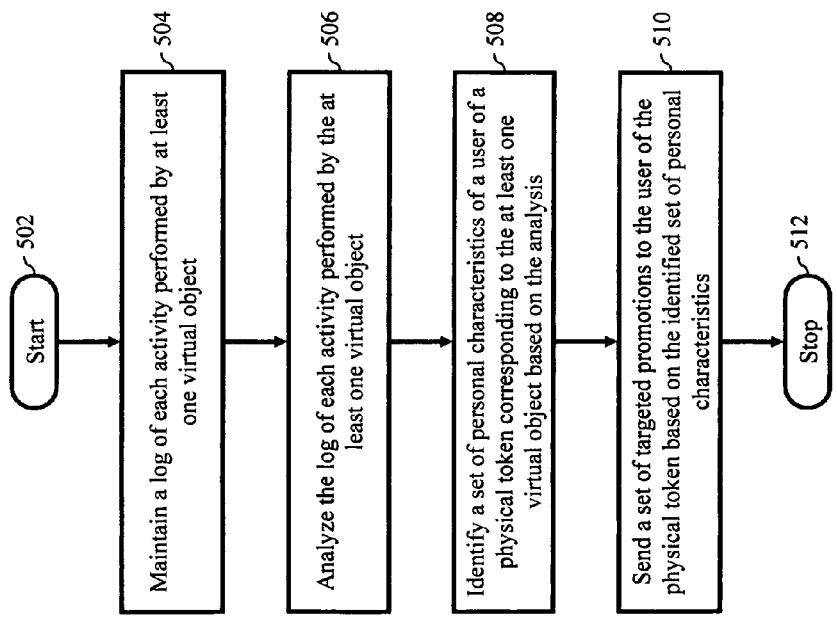
FIG. 5 is a flow diagram of a method for targeting promotions to users of virtual systems in accordance with an embodiment of the invention.

FIG. 5 is a flow diagram of a method for targeting promotions to users of virtual systems in accordance with an embodiment of the invention. To describe the flow diagram, reference will be made to FIG. 1 and FIG. 2, although it should be understood that the flow diagram can be implemented in any other suitable environment or network. Moreover, the invention is not limited to the order in which the steps have been listed in the flow diagram.

The method for targeting promotions to the users of the virtual systems is initiated at step 502. At step 504, a log of each activity performed by at least one virtual object of the virtual systems is maintained. In an exemplary scenario, the at least one virtual object can be the same or similar to the virtual objects described in FIG. 1. In an embodiment, the processor 206 can maintain the log of each activity performed by the at least one virtual object. Also, the memory module 208 can store the historical log of all activities performed by the at least one virtual object for future use. For example, a virtual character named Suzie can live in a human virtual world. Suzie, on a given day, buys a car, adds accessories to the car, goes to an amusement park, watches a movie, and buys DVDs of movies. All these activities can be recorded in the log of Suzie's activities.

At step 506, the log of each activity performed by the at least one virtual object is analyzed. In an embodiment, the processor 206 can analyze the log of each activity performed by the at least one virtual object. Thereafter, at step 508, a set of personal characteristics of a user of the at least one virtual object are identified based on the analysis performed in step 506. The at least one virtual object corresponds to a physical token that is used by the user to access the at least one virtual object. In light of the above example, an exemplary set of personal characteristics of the user of Suzie, which may be identified from the analysis of the log of Suzie's activities, can include her interest in cars, her craze for movies and her attraction towards an amusement park. Thereafter, the method flow proceeds to step 510.

At step 510, a set of targeted promotions are sent to the user of the at least one virtual object based on the identified set of personal characteristics. In an embodiment, the processor 206 can target promotions to the user of the at least one virtual object. The targeted promotions include the promotions linked to the personal characteristics that have been identified for the user based on the analysis. In light of the above example, promotions relating to cars, movies and amusement parks can be targeted to the user of Suzie. Since the user tends to have more interest in these particular areas, the chances of the user availing herself of the promotions becomes higher. The method is terminated at step 512.

In an exemplary scenario, the method described above can be used in conjunction with the method for managing at least one virtual object described in FIG. 3 and the method for providing interoperability of the at least one virtual object across a set of virtual systems described in FIG. 4.

The method and system for managing at least one virtual object in a network facilitates trading of virtual objects by linking them to physical objects. This enables the owner of a virtual object to extract its monetary value in the real world. Further, the method and system provides access to virtual objects as well as their sub-parts in a customizable form thus enhancing the flexibility in trading. Also, the method and system provide interoperability across a set of virtual worlds and a more efficient technique for targeting promotions to people by observing their behavioral traits while interacting with the set of virtual systems.

The method and system for managing at least one virtual object in a network, as described in the present invention, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, and the like. Further, the storage device can be other similar means for loading computer programs or other instructions into the computer system.

The computer system executes a set of instructions that are stored in one or more storage elements, to process input data. The storage elements may also hold data or other information, as desired. The storage elements may be in the form of an information source or a physical memory element present in the processing machine. Exemplary storage elements include a hard disk, a DRAM, an SRAM and an EPROM. The storage elements may be external to the computer system and connected to or inserted into it, to be downloaded at or prior to the time of use. Examples of such external computer program products include computer-readable storage mediums such as CD-ROMS, flash chips, floppy disks, and the like.

The set of instructions may include various commands that instruct the processing machine to perform specific tasks such as the steps constituting the method of the present invention. The set of instructions may be in the form of a software program. The software may be in various forms such as system software or application software. Further, the software may be in the form of a collection of separate programs, a program module with a larger program, or a portion of a program module. The software may also include modular programming in the form of object-oriented programming. The software program containing the set of instructions can be embedded in a computer program product, for use with a computer; the computer program product comprising a computer-usable medium with a computer-readable program code embodied therein. Processing of input data by the processing machine may be in response to users' commands, to the results of previous processing, or to a request made by another processing machine.

The modules described herein may include processors and program instructions that implement the functions of the modules described herein. Some or all the functions can be implemented by a state machine that has no stored program instructions, or in one or more application-specific integrated circuits (ASICs), in which each function or some combinations of certain of the functions are implemented as custom logic.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as set forth in the claims.

What is claimed is:

1. A method for managing at least one virtual object in a network, the method comprising:
creating a unique link between the at least one virtual object and a physical token, wherein the at least one virtual object is represented by a first set of distinct predefined properties and is associated with a data set and the physical token has a magnetic stripe with a unique magnetic fingerprint based on the arrangement of magnetic particles in the magnetic stripe, making the physical token distinct from every other physical token;
maintaining information about the unique link between the at least one virtual object and the physical token and information about the first set of distinct predefined properties; and
regulating access to the at least one virtual object based on a second set of predefined properties and verification of the physical token based on:
deriving an electronic representation of the unique magnetic fingerprint of the magnetic stripe on the physical token that is based on the arrangement of magnetic particles in the magnetic stripe; and
verifying the authenticity of the physical token using the electronic representation of the unique magnetic fingerprint of the magnetic stripe on the physical token;
wherein the second set of predefined properties includes properties defining the access to be granted to the virtual object on verification of the physical token.

2. The method as recited in claim 1 further comprising storing at least one of the first set of distinct predefined properties and the data set at a memory module.

3. The method as recited in claim 1, wherein regulating access to the at least one virtual object comprises granting access to the at least one virtual object when the authenticity of the physical token is verified.

4. The method as recited in claim 3, wherein granting access to the at least one virtual object comprises providing at least one of a reading right, a writing right and a modifying right for the at least one virtual object based on the second set of predefined properties.

5. The method as recited in claim 4 further comprising altering one or more of the unique link and the first set of distinct predefined properties based on the access granted.

6. The method as recited in claim 1 further comprising maintaining a log of each activity performed by the at least one virtual object.

7. The method as recited in claim 6 further comprising analyzing the log of each activity performed by the at least one virtual object.

8. The method as recited in claim 7 further comprising identifying a set of personal characteristics of a user of the physical token corresponding to the at least one virtual object based on the analysis.

9. The method as recited in claim 8 further comprising sending a set of targeted promotions to the user of the physical token based on the identified set of personal characteristics.

10. The method as recited in claim 1, wherein the at least one virtual object is associated with at least one virtual system.

11. The method as recited in claim 10 further comprising allowing interoperability of the at least one virtual object across a set of virtual systems, based on the first set of distinct predefined properties and the data set corresponding to the at least one virtual object.

12. The method as recited in claim 11 further comprising applying a compatibility function to the at least one virtual object for interoperability across the set of virtual systems.

13. The method as recited in claim 1, wherein the first set of distinct predefined properties comprises one or more properties from the group consisting of system properties, linking properties, object properties, schema-oriented properties, pointer-oriented properties, and signature-oriented properties.

14. The method as recited in claim 1, wherein the at least one virtual object is contextually associated with a set of virtual objects.

15. A system for managing at least one virtual object in a network, the system comprising:
   a linking module configured to create a unique link between the at least one virtual object and a physical token, wherein the at least one virtual object is represented by a first set of distinct predefined properties and is associated with a data set and the physical token has a magnetic stripe with a unique magnetic fingerprint based on the arrangement of magnetic particles in the magnetic stripe, making the physical token distinct from every other physical token;
   a database configured to maintain information about the unique link between the at least one virtual object and the physical token and information about the first set of distinct predefined properties; and
   a processor configured to regulate access to the at least one virtual object based on a second set of predefined properties and verification of the physical token based on:
      deriving an electronic representation of the unique magnetic fingerprint of the magnetic stripe on the physical token that is based on the arrangement of magnetic particles in the magnetic stripe; and
      verifying the authenticity of the physical token using the electronic representation of the unique magnetic fingerprint of the magnetic stripe on the physical token;
      wherein the second set of predefined properties includes properties defining the access to be granted to the virtual object on verification of the physical token.

16. The system as recited in claim 15 further comprising a memory module for storing at least one of the first set of distinct predefined properties and the data set.

17. The system as recited in claim 15, wherein the at least one virtual object is selected from the group consisting of a character in an online game, a profile in a social networking system, a character in a virtual world, an avatar in a virtual world, a shopping cart, a customer account, an electronic representation of a legal document, an electronic representation of a user medical data, an electronic representation of money, an electronic representation of a membership, an electronic representation of ownership of a physical object, an electronic representation of rights to access to a resource, a customer profile, a system configuration, a discount on items for sale, an offer to sell a physical object, an offer to sell a virtual object, a bid at an auction, an electronic representation of loyalty points, the status of a membership, a computer code, and an executable script.

18. The system as recited in claim 15, wherein the physical token is selected from the group consisting of a memory card, a magnetic stripe card, a smart card, a card with a barcode, a cell phone, an electronic device, an electronic device with an embedded serialization, a unique electronic device, a fingerprint, a pattern of a human iris, a pattern of blood vessels in a human cornea, a human DNA, and a biometric characteristic.

19. The system as recited in claim 15 further comprising a reading device for reading the physical token, wherein the reading device is associated with a virtual system.

20. The system as recited in claim 19, wherein the reading device is configured for use across a set of virtual systems based on a set of predefined conditions.

21. The system as recited in claim 15 further comprising an authenticating module for verifying authenticity of the physical token based on an electronic representation of the physical token derived from a reading device.

22. The system as recited in claim 16, wherein the processor is further configured for performing at least one of:
   a) granting access to the at least one virtual object when the physical token has been verified, wherein the access provides at least one of a reading right, a writing right and a modifying right for the at least one virtual object based on the second set of predefined properties;
   b) altering one or more of the unique link and the first set of distinct predefined properties based on the access granted;
   c) maintaining a log of each activity performed by the at least one virtual object;
   d) analyzing the log of each activity performed by the at least one virtual object;
   e) identifying a set of personal characteristics of a user of the physical token corresponding to the at least one virtual object based on the analysis; and
   f) applying a compatibility function to the at least one virtual object for interoperability across a set of predefined virtual systems.

* * * * *